US011882233B2

(12) United States Patent
Nomura et al.

(10) Patent No.: US 11,882,233 B2
(45) Date of Patent: *Jan. 23, 2024

(54) MOBILE TERMINAL DEVICE WITH FUNCTION LIMITATION, FUNCTION LIMITATION METHOD THEREOF, AND PROCESSING PROGRAM USED IN SAME

(71) Applicant: Maxell, Ltd., Kyoto (JP)

(72) Inventors: Tomonori Nomura, Oyamazaki (JP); Yasunobu Hashimoto, Oyamazaki (JP); Mitsunobu Watanabe, Oyamazaki (JP); Kazuhiko Yoshizawa, Oyamazaki (JP); Hiroshi Shimizu, Oyamazaki (JP); Hirokazu Ishii, Oyamazaki (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,033

(22) Filed: Sep. 30, 2022

(65) Prior Publication Data
US 2023/0027771 A1 Jan. 26, 2023

Related U.S. Application Data

(63) Continuation of application No. 16/610,056, filed as application No. PCT/JP2017/020694 on Jun. 2, 2017, now Pat. No. 11,496,618.

(51) Int. Cl.
*H04M 1/72454* (2021.01)
*H04M 1/67* (2006.01)
(Continued)

(52) U.S. Cl.
CPC ......... *H04M 1/72454* (2021.01); *H04M 1/67* (2013.01); *H04M 1/72463* (2021.01); *H04W 48/04* (2013.01); *H04M 2250/12* (2013.01)

(58) Field of Classification Search
None
See application file for complete search history.

(56) References Cited

U.S. PATENT DOCUMENTS

| 8,706,143 B1 | 4/2014 | Elias |
| 10,637,985 B1 | 4/2020 | Saad |

(Continued)

FOREIGN PATENT DOCUMENTS

| CN | 105573206 A | 5/2016 |
| JP | 2008-205573 A | 9/2008 |

(Continued)

OTHER PUBLICATIONS

International Search Report issued in corresponding International Patent Application No. PCT/JP2017/020694, dated Aug. 22, 2017, with English translation.

(Continued)

*Primary Examiner* — Quoc D Tran
(74) *Attorney, Agent, or Firm* — Rimon, P.C.

(57) ABSTRACT

The purpose is to provide a mobile terminal device that can limit the use of the application by detecting the user position of the mobile terminal device and the speed of the vehicle by itself. To this end, provided is a function limitation method of a mobile terminal device with function limitation capable of limiting a use of an application, including, a step of determining whether or not a limitation target application of the mobile terminal device is in activation, a usage position check step of determining, by the mobile terminal device, a user of the mobile terminal device is on a driver seat, and a speed check step of calculating, by the mobile terminal device, a vehicle in which the user of the mobile terminal device is riding is traveling, in which the use of the appli- (Continued)

cation is limited or terminated when the user of the mobile terminal device is on the driver seat, and the vehicle is traveling.

16 Claims, 10 Drawing Sheets

(51) Int. Cl.
*H04W 48/04* (2009.01)
*H04M 1/72463* (2021.01)

(56) References Cited

U.S. PATENT DOCUMENTS

| | | |
|---|---|---|
| 11,496,618 B2* | 11/2022 | Nomura ................ H04M 1/67 |
| 2013/0281079 A1 | 10/2013 | Vidal et al. |
| 2014/0113619 A1 | 4/2014 | Tibbitts et al. |
| 2014/0134992 A1 | 5/2014 | Ludick |
| 2019/0289126 A1 | 9/2019 | Moir et al. |
| 2021/0394766 A1 | 12/2021 | Crawford et al. |

FOREIGN PATENT DOCUMENTS

| | | |
|---|---|---|
| JP | 2010-81319 A | 4/2010 |
| JP | 2013-128226 A | 6/2013 |
| JP | 2016-509763 A | 3/2016 |
| WO | 2014/080570 A1 | 5/2014 |

OTHER PUBLICATIONS

Written Opinion issued in corresponding International Patent Application No. PCT/JP2017/020694, dated Aug. 22, 2017, with English translation.
Non-Final Office Action issued in U.S. Appl. No. 16/610,056, dated Jan. 21, 2022.
Notice of Allowance issued in U.S. Appl. No. 16/610,056, dated Jul. 1, 2022.
Chinese Office Action issued in corresponding Chinese Patent Application No. 201780089093.1, dated Jul. 10, 2020, with English translation.
Japanese Notice of Reasons for Refusal issued in corresponding Japanese Patent Application No. 2019-521927, dated Jul. 7, 2020, with English translation.

* cited by examiner

F I G. 1
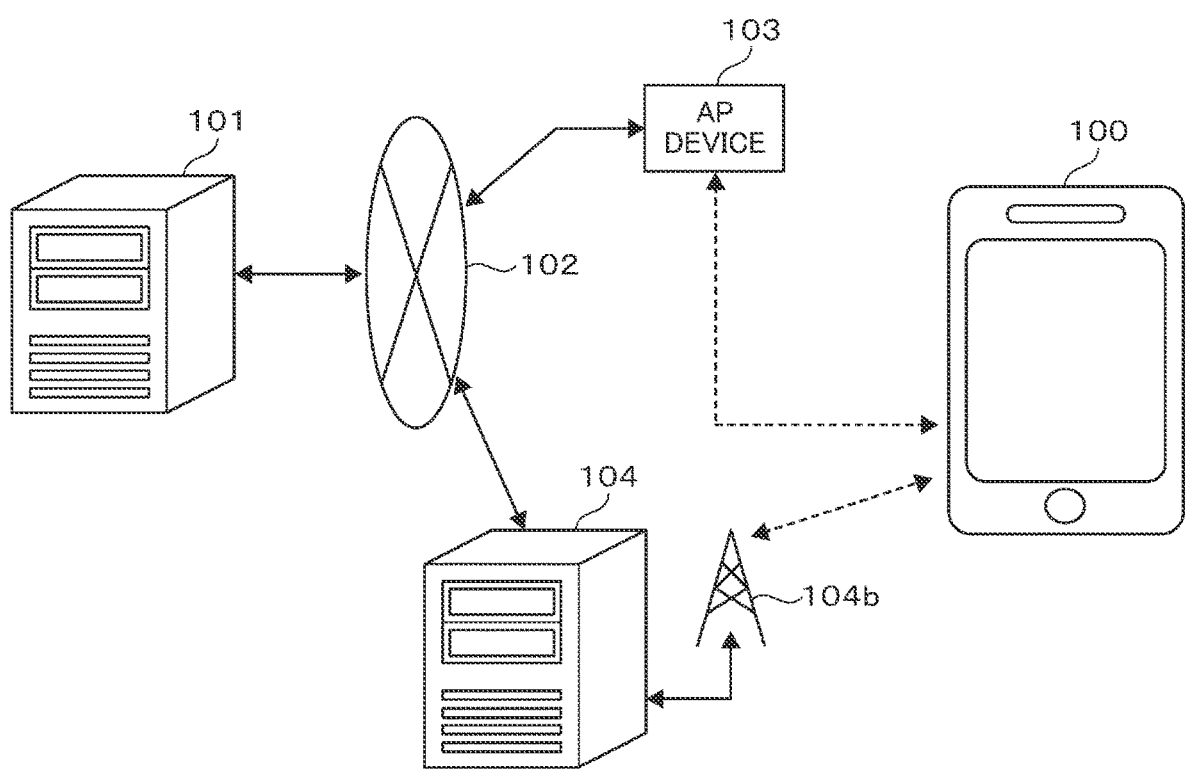

| OVERSPEED FLAG | DRIVER SEAT USAGE FLAG | PROCESS WHILE APPLICATION IS IN ACTIVATION |
|---|---|---|
| 0 | 0 | APPLICATION LIMITATION CANCELLATION |
| 0 | 1 | APPLICATION LIMITATION CANCELLATION |
| 1 | 0 | APPLICATION LIMITATION CANCELLATION |
| 1 | 1 | APPLICATION LIMITATION /END |

FIG. 11

| OVERSPEED FLAG | DRIVER SEAT USAGE FLAG | VEHICLE POSITION PROHIBITION FLAG | PROCESS WHILE APPLICATION IS IN ACTIVATION |
|---|---|---|---|
| 0 | 0 | 0 | APPLICATION LIMITATION CANCELLATION |
| 0 | 0 | 1 | APPLICATION LIMITATION CANCELLATION |
| 0 | 1 | 0 | APPLICATION LIMITATION CANCELLATION |
| 0 | 1 | 1 | APPLICATION LIMITATION /END |
| 1 | 0 | 0 | APPLICATION LIMITATION CANCELLATION |
| 1 | 0 | 1 | APPLICATION LIMITATION CANCELLATION |
| 1 | 1 | 0 | APPLICATION LIMITATION /END |
| 1 | 1 | 1 | APPLICATION LIMITATION /END |

FIG. 12

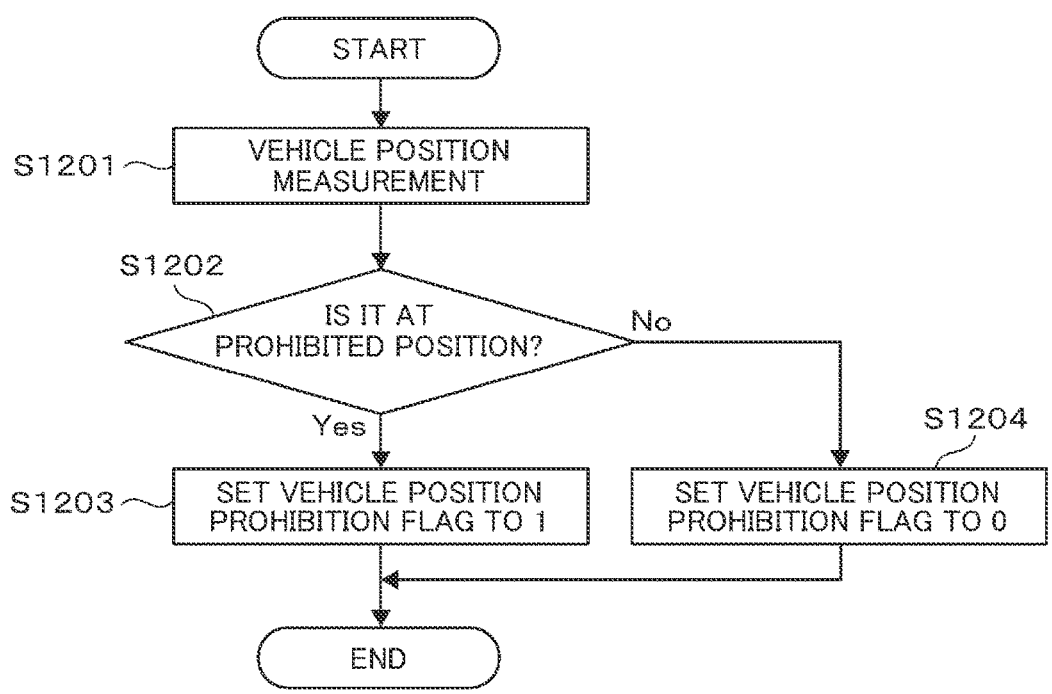

MOBILE TERMINAL DEVICE WITH FUNCTION LIMITATION, FUNCTION LIMITATION METHOD THEREOF, AND PROCESSING PROGRAM USED IN SAME

CROSS-REFERENCE OF RELATED APPLICATIONS

This application is a continuation of U.S. application Ser. No. 16/610,056, filed Oct. 31, 2019, which is the U.S. National Phase under 35 U.S.C. § 371 of International Patent Application No. PCT/JP2017/020694, filed on Jun. 2, 2017, the entire disclosure of which application is incorporated by reference herein.

TECHNICAL FIELD

The present invention relates to a mobile terminal device with function limitation, a function limitation method thereof, and a processing program used in the same which are capable of prohibiting or limiting the use of a function of a mobile terminal device.

BACKGROUND ART

In recent years, mobile terminal devices such as smartphones have become very popular, and the use of SNS and applications by Internet connection has increased rapidly. As a result, accidents caused by using mobile terminal devices while driving an automobile are increasing. To prevent this, it is necessary to prohibit or limit the use of the mobile terminal device while driving.

As background arts of this technical field, JP 2013-128226 A (Patent Document 1) and U.S. Pat. No. 8,706,143 (Patent Document 2) are known. A mobile terminal usage limitation device that determines whether or not a driver is operating a mobile terminal while driving even though the driver is not in an emergency state and can limit an operation of the mobile terminal on the basis of this is disclosed in Patent Document 1. A technique of recognizing whether or not a usage environment of a mobile terminal device is in a traveling automobile using a vibration sensor mounted on the mobile terminal device and forcibly locking the mobile terminal device so that it is unable to be used while driving when the usage environment of the mobile terminal device is recognized to be in the traveling automobile is disclosed in Patent Document 2.

CITATION LIST

Patent Document

Patent Document 1: JP 2013-128226 A
Patent Document 2: U.S. Pat. No. 8,706,143

SUMMARY OF THE INVENTION

Problems to be Solved by the Invention

In the technique disclosed in Patent Document 1, it is determined whether or not the driver is operating the mobile terminal and whether or not the driver is in an emergency state on the basis of the driver's driving state detected by a driver state detecting means and limiting the use of the mobile terminal device on the basis of the determination result. However, it is not considered that an external device that limits the use other than the mobile terminal such as a driver monitoring camera, a sound collection microphone, a heart rate monitor, or a handle pressure sensor, is required as the driver state detection means, and a device configuration becomes complicated.

In the technique disclosed in Patent Document 2, since the speed is estimated from vibration, it is likely that an estimated speed value is inaccurate, and determination of whether or not the vehicle is traveling is wrong.

It is an object of the present invention to provide a mobile terminal device with function limitation, a function limitation method thereof, and a processing program used in the same which are capable of detecting a position of a user of a mobile terminal device or a speed of a vehicle and limiting the use thereof through the mobile terminal device alone.

Solutions to Problems

In light of the background art and the problems, as an example, the present invention provides a function limitation method of a mobile terminal device with function limitation capable of limiting a use of an application, including: a step of determining whether or not a limitation target application of the mobile terminal device is in activation; a usage position check step of determining, by the mobile terminal device, a user of the mobile terminal device is on a driver seat; and a speed check step of calculating, by the mobile terminal device, a vehicle in which the user of the mobile terminal device is riding is traveling, in which the use of the application is limited or terminated when the user of the mobile terminal device is on the driver seat, and the vehicle is traveling.

Effects of the Invention

According to the present invention, it is possible to provide a mobile terminal device with function limitation, a function limitation method thereof, and a processing program used in the same which are capable of limiting the use of the mobile terminal device through the mobile terminal device alone.

BRIEF DESCRIPTION OF THE DRAWINGS

FIG. 1 is a configuration diagram of a communication system including a mobile terminal device in a first embodiment.

FIG. 11 is a condition diagram for describing conditions for limiting the use of an application of the mobile terminal device in the second embodiment.

FIG. 12 is a flowchart illustrating a vehicle position check process of FIG. 11 in the second embodiment.

MODE FOR CARRYING OUT THE INVENTION

Figure 2:
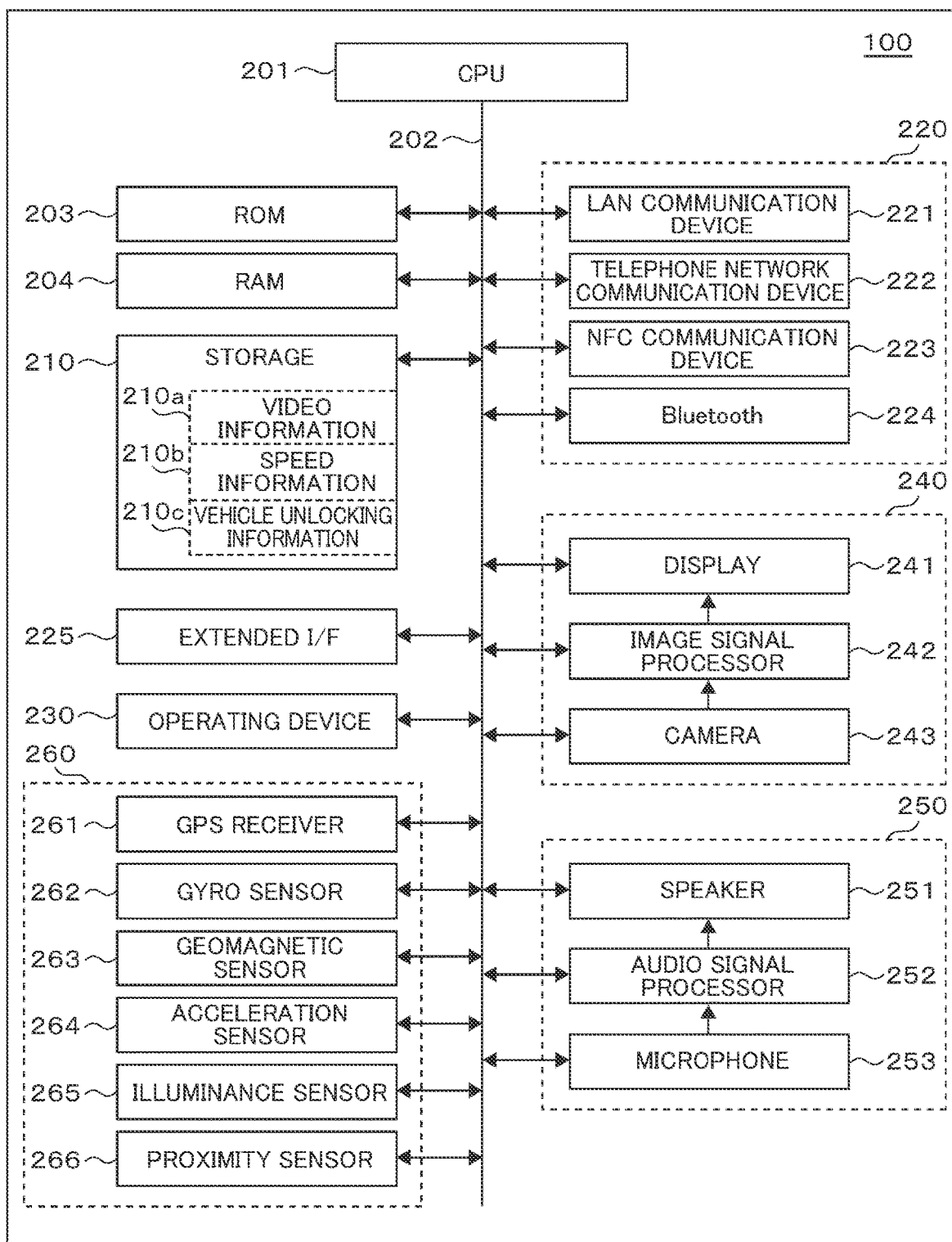
FIG. 2 is a block diagram illustrating an internal configuration of the mobile terminal device in the first embodiment.

Hereafter, exemplary embodiments of the present invention will be described with reference to the appended drawings.

First Embodiment

FIG. 1 is a block diagram of a communication system including a mobile terminal device 100 in the present embodiment. As illustrated in FIG. 1, the communication system in the present embodiment includes the mobile terminal device 100 used by the user, a base station 104b of a mobile telephone network, a mobile server 104, a wide area public network 102 such as the Internet, an access point (AP) device 103, a delivery server 101, and the like.

The mobile terminal device 100 and the delivery server 101 are connected to the access point (AP) device 103 or the base station 104b via the wide area public network 102 such as the Internet. The mobile terminal device 100 can obtain various types of information from the mobile server 104 via the base station 104b of the mobile telephone network. Further, the mobile terminal device 100 can obtain various types of information from the mobile server 104 via the wide area public network 102 by establishing a connection with the AP device 103. The mobile terminal device 100 acquires information from the delivery server 101.

FIG. 2 is a block diagram illustrating an example of an internal configuration of the mobile terminal device 100 in the present embodiment. In FIG. 2, the mobile terminal device 100 includes a CPU 201, a system bus 202, a ROM 203, a RAM 204, a storage 210, a communication processor 220, an extended interface 225, an operating device 230, a video processor 240, an audio processor 250, and a sensor 260.

The CPU 201 is a microphone processor unit that controls the entire mobile terminal device 100. The system bus 202 is a data communication path for performing transmission and reception of data between the CPU 201 and the respective operation blocks in the mobile terminal device 100.

The ROM 203 is a memory in which a basic operating program such as an operating system and other operating programs are stored, and for example, a rewritable ROM such as an EEPROM or a flash ROM is used as the ROM 203. The RAM 204 is a work area for executing the basic operating program and other operating programs. The ROM 203 and the RAM 204 may be integrated with the CPU 201. Further, the ROM 203 may not have an independent configuration as illustrated in FIG. 2, but a partial storage area in the storage 210 may be used as the ROM 203.

The storage 210 stores the operating program and operation setting values of the mobile terminal device 100, personal information of the user of the mobile terminal device 100, and the like. Further, the storage 210 includes video information 210a, speed information 210b, and vehicle unlocking information 210c. Further, the storage 210 can store an operating program downloaded from a network and various types of data or the like generated by the operating program. The storage 210 can also store content such as moving images, still images, and audio downloaded from the network. Further, some or all of the functions of the ROM 203 may be replaced by a partial area of the storage 210. Further, it is necessary for the storage 210 to hold stored information even when the mobile terminal device 100 is not supplied with electric power from the outside. Therefore, for example, a device such as a flash ROM, an SSD, or an HDD is used as the storage 210.

Each operating program stored in the ROM 203 or the storage 210 can be updated and expanded by a download process from each server device on the wide area public network 102.

The communication processor 220 includes a LAN communication device 221, a telephone network communication device 222, an NFC communication device 223, and a Bluetooth (registered trademark) 224. The LAN communication device 221 is connected with the wide area public network 102 via the AP device 103, and performs transmission/reception to/from each server device on the wide area public network 102. A connection with the AP device 103 is assumed to be established by a wireless connection such as Wi-Fi (registered trademark). The telephone network communication device 222 performs telephone communication (call) and transmission/reception of data by wireless communication with the base station 104b of the mobile telephone network. The NFC communication device 223 performs wireless communication when it is in close proximity to a corresponding reader/writer. The Bluetooth 224 performs wireless communication for detecting IDs of terminals coming close thereto. Each of the LAN communication device 221, the telephone network communication device 222, the NFC communication device 223, and the Bluetooth 224 is assumed to include an encoding circuit, a decoding circuit, an antenna, and the like. The communication processor 220 may further include infrared communication and other communication devices.

The extended interface 225 is an interface group for extending the function of the mobile terminal device 100, and in the present embodiment, the extended interface 225 is assumed to include a video/audio interface, a USB interface, a memory interface, and the like. The video/audio interface receives a video signal/audio signal from an external video/audio output device, outputs a video signal/audio signal to an external video/audio input device, or the like. The USB interface is connected to a PC or the like and performs transmission and reception of data. Further, the USB interface establishes a connection with a keyboard or other USB devices. The memory interface establishes a connection with a memory card or other memory media and performs transmission and reception of data.

The operating device 230 is an instruction input device that inputs an operation instruction to the mobile terminal device 100, and in the present embodiment, the operating device 230 is assumed to be configured with a touch panel arranged superimposed on a display 241 and an operation key in which button switches are arranged. Any one of them may be used, and the mobile terminal device 100 may be operated using a keyboard connected to the extended interface 225. Further, the mobile terminal device 100 may be operated using a separate mobile terminal device connected by wired communication or wireless communication. The display 241 may have the touch panel function.

The video processor 240 includes the display 241, an image signal processor 242, and a camera 243. The display 241 is a display device such as a liquid crystal panel, and displays image data processed by the image signal processor 242 and provides it to the user of the mobile terminal device 100. The image signal processor 242 has a video RAM (not illustrated), and the display 241 is driven on the basis of the image data input to the video RAM. The image signal processor 242 has a function of performing format conversion, a superimposition process of a menu or other on screen display (OSD) signals, or the like if necessary. The camera 243 is a camera unit that functions as an imaging device that converts light input from a lens into an electrical signal using an electronic device such as a charge coupled device (CCD) or complementary metal oxide semiconductor (CMOS) sensor, and inputs image data of a surrounding area or an object.

The audio processor 250 includes a speaker 251, an audio signal processor 252, and a microphone 253. The speaker 251 provides an audio signal processed by the audio signal processor 252 to the user of the mobile terminal device 100. The microphone 253 converts the user's voice into voice data and inputs it.

The sensor 260 is a sensor group for detecting a state of the mobile terminal device 100, and in the present embodiment, the sensor 260 includes a GPS receiver 261, a gyro sensor 262, a geomagnetic sensor 263, an acceleration sensor 264, an illuminance sensor 265, and a proximity sensor 266. With the sensor groups, it is possible to detect a position, an inclination, a direction, and a motion of the mobile terminal device 100, ambient brightness, a proximity situation of a surrounding object, and the like. The mobile terminal device 100 may further include other sensors such as a barometric pressure sensor. The position information is acquired by the GPS receiver 261, but in a case in which it is unable to be acquired in a place in which GPS signals are difficult to enter, it may be acquired from position information on a Wi-Fi AP device by the LAN communication device 221, or it may be acquired from base station information by the telephone network communication device 222.

The mobile terminal device 100 may be a feature phone, a smart phone, a tablet terminal, a wearable terminal, or the like. It may also be a personal digital assistants (PDA) or a manual PC. It can also be a digital still camera, a video camera capable of capturing moving images, a portable game machine, or other portable digital devices.

Further, the configuration example of the mobile terminal device 100 illustrated in FIG. 2 includes a number of components which are not essential for the present embodiment such as the sensor 260, but the effects of the present embodiment can be achieved even if these components are not disposed. Further, components not illustrated in the drawings such as a digital broadcast reception function or an electronic money payment function may be added.

Figure 3:
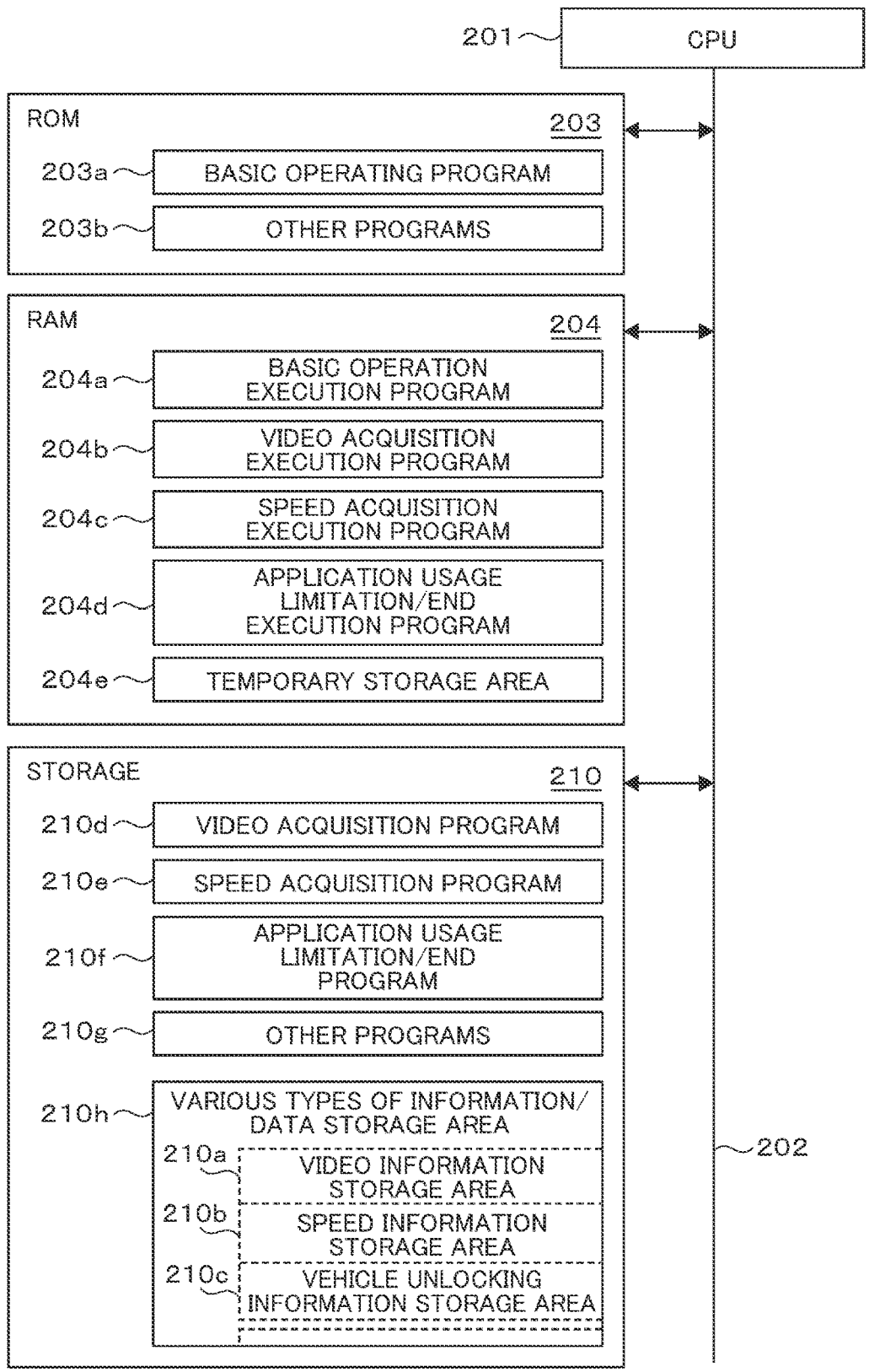
FIG. 3 is a software configuration diagram illustrating the internal configuration of the mobile terminal device in the first embodiment.

FIG. 3 is a software configuration diagram illustrating an example of the internal configuration of the mobile terminal device 100 in the present embodiment. In FIG. 3, the ROM 203 includes a basic operating program 203a such as an operating system and other operating programs 203b. The RAM 204 includes a basic operation execution program 204a that executes a basic operating program, a video acquisition execution program 204b that acquires videos, a speed acquisition execution program 204c that acquires a speed, an application stop/limitation execution program 204d to be described later, and a temporary storage area 204e. The storage 210 stores 210d to 210f which are operating programs corresponding to 204b to 204d executed in the RAM. 210g indicates other programs. Further, various types of information/data storage area 210h may be disposed in the temporary storage area 204e of the RAM 204.

Figure 4:
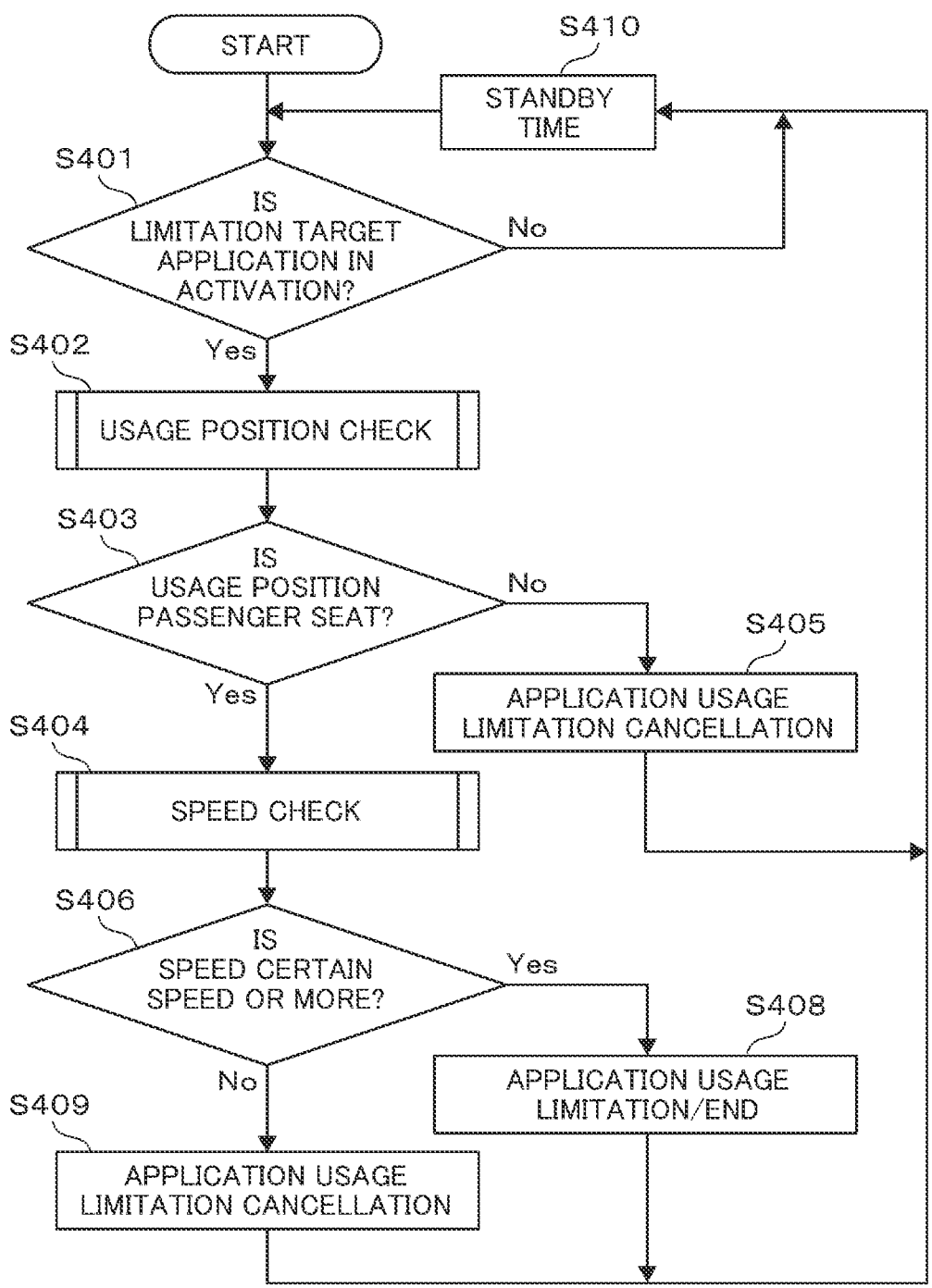
FIG. 4 is a flowchart illustrating a process for limiting the use of an application of the mobile terminal device in the first embodiment.

FIG. 4 is a flowchart illustrating a process of limiting the use of an application of the mobile terminal device (hereinafter abbreviated as an "application") in the present embodiment. In FIG. 4, first, in step S401, it is checked whether or not a target application whose use is limited or prohibited while driving is in activation. Here, the application whose use is limited or prohibited while driving is an application that interferes with driving, and, for example, an application that requires an operation within a predetermined time or an application that requires a number of operations that exceeds a certain number of times are targets. Conversely, applications that do not interfere with driving are excluded. For example, a car vision application, an application for listening to music with a speaker via Bluetooth, an application for listening to a phone call with handsfree, and the like are excluded. If the limitation target application is not in activation, in S410, it is on standby for a predetermined time, and it is repeatedly checked whether or not the limitation target application is in activation in S401.

In a case in which the limitation target application is in activation in S401, in S402, a usage position check process of checking the position of the user using the mobile terminal device is executed. The usage position check process S402 will be described later in detail, but it is a check to see if the user of the mobile terminal device is at the driver seat, and when the user is at the driver seat, a driver seat usage flag is set to 1. Then, in S403, it is determined whether or not the usage position of the mobile terminal device is the driver seat, and if it is not the driver seat, in S405, the application usage limitation is canceled, and the process returns to S410.

If the usage position of the mobile terminal device is the driver seat in S403, in S404, a speed check process of checking whether or not the vehicle in which the user of the mobile terminal device is riding is traveling is executed. The speed check process S404 will be described later in detail, but when the speed is a predetermined speed or more, an overspeed flag is set to 1. Here, the "predetermined speed" is intended to ignore a degree of human motion and is to detect a state in which the vehicle is traveling without being stopped. Then, in S406, it is determined whether or not the speed of the vehicle is a certain speed or more, that is, whether or not the vehicle is traveling, and if it is a certain speed or more, in S408, the use of the application is limited or terminated, and the process returns to S410. If it is neither a certain speed nor more, in S409, it is determined that the vehicle is stopped, and the application usage limitation is canceled, and the process returns to S410. The order of the usage position check process of S402 and the speed check process of S404 may be interchanged, but it is preferable to perform the process with a relatively small processing amount first.

Figures 5, 6:
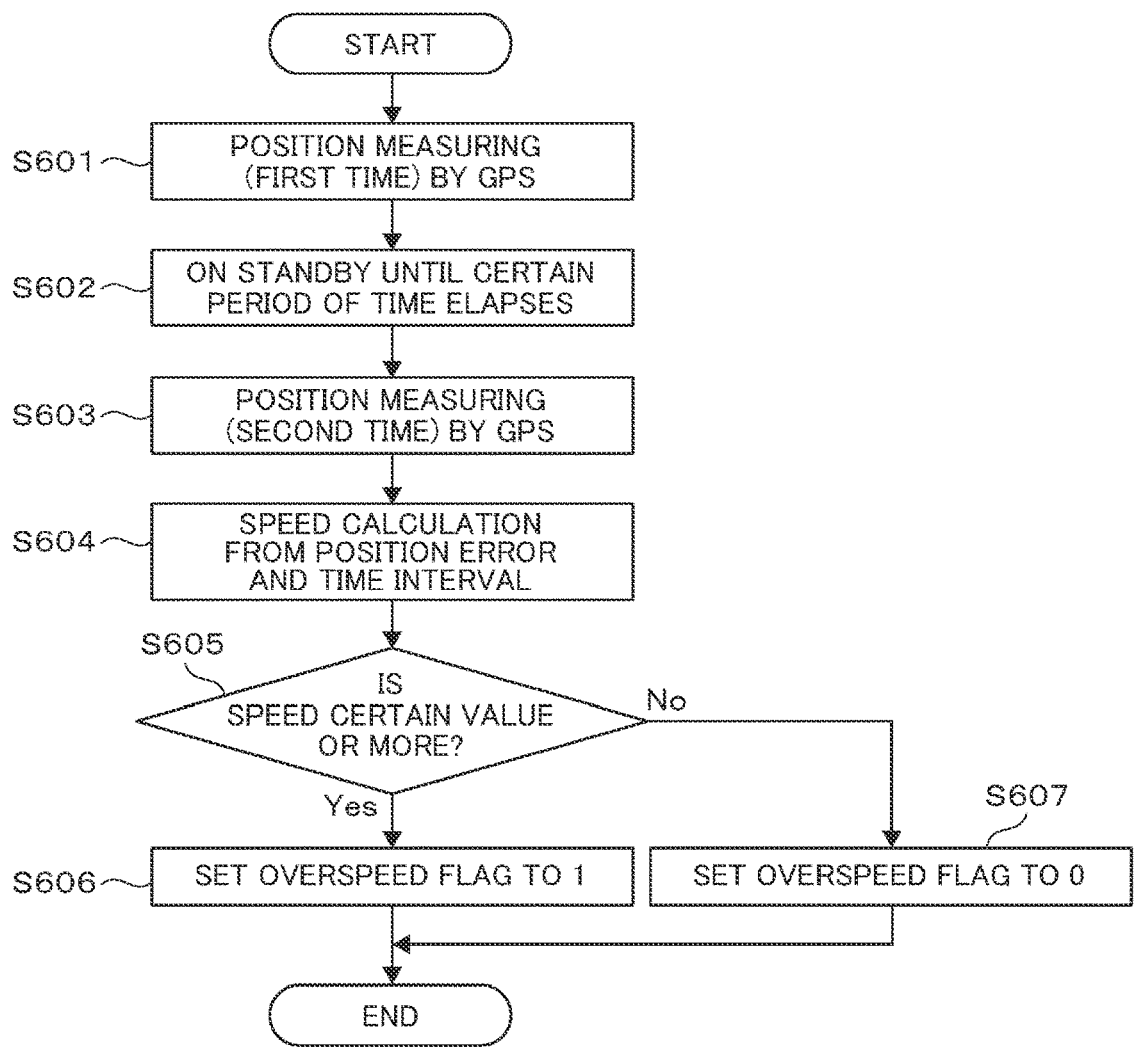
FIG. 5 is a condition diagram for describing conditions for limiting the use of an application of the mobile terminal device in the first embodiment.
FIG. 6 is a flowchart illustrating a speed check process of FIG. 4 in the first embodiment.

FIG. 5 is a condition diagram for describing conditions for limiting the use of the application of the mobile terminal device in the present embodiment. FIG. 5 illustrates a relation between the overspeed flag, the driver seat usage flag, and the process while the application is in activation. In FIG. 5, when both the overspeed flag and the driver seat usage flag are 1, it is determined that the user of the mobile terminal device is sitting on the driver seat and driving the vehicle, and thus the use of the application is limited or terminated. On the other hand, when only the overspeed flag is 1, it is determined that a person other than the user of the mobile terminal device is driving, and thus the usage limitation of the application is canceled, and the application can become a usable state. Further, when only the driver seat usage flag is 1, it is determined that the user of the mobile terminal device is at the driver seat, but the vehicle is stopped, and thus the application usage limitation is canceled, and the application can become a usable state. Further, when both the overspeed flag and the driver seat usage flag are 0, it is determined that a person other than the user of the mobile terminal device is driving, and the vehicle is stopped, and thus the application usage limitation is canceled, and the application can become a usable state.

FIG. 6 is a flowchart illustrating the speed check process of S404 in FIG. 4 in the present embodiment. In FIG. 6, the speed of the vehicle in which the user of the mobile terminal device is riding is checked using the GPS receiver of the mobile terminal device. In FIG. 6, first, in step S601, a first position is measured by the GPS receiver. Then, in S602, it is on standby for a certain period of time, and in S603, a second position is measured by the GPS receiver. In S604, the speed is calculated from a position difference and a time interval. Then, it is determined whether or not the speed calculated in S605 is a predetermined value or more, and if it is the predetermined value or more, in S606, the overspeed flag is set to 1, and if it is neither the predetermined value nor more, in S607, the overspeed flag is set to 0, and the process ends.

Figure 7:
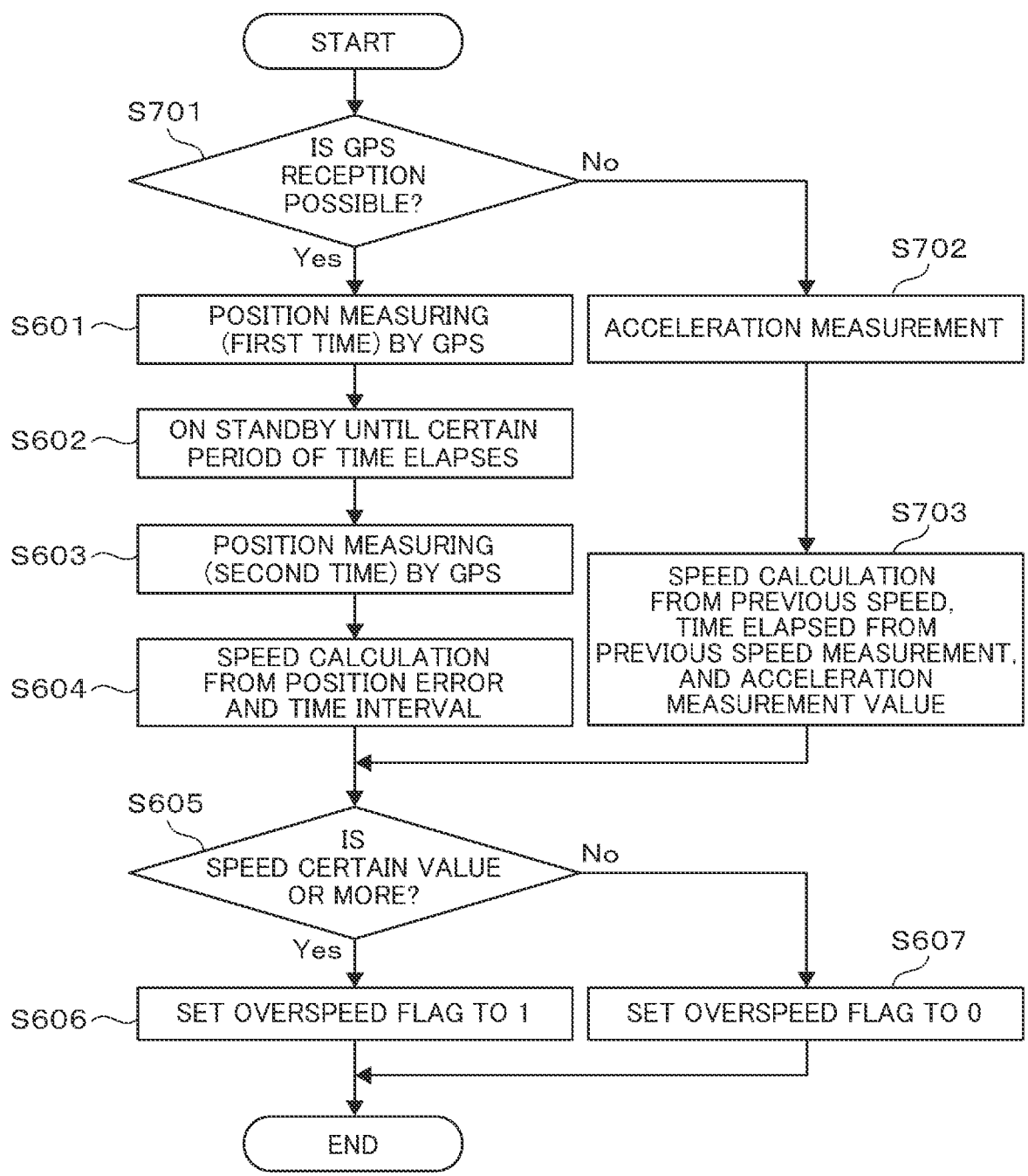
FIG. 7 is a flowchart illustrating a modified example of the speed check process of FIG. 4 in the first embodiment.

FIG. 7 is a flowchart illustrating a modified example of the speed check process of S404 in FIG. 4 in the present embodiment. In FIG. 7, processes similar to those of FIG. 6 are denoted by the same reference numerals, and description thereof is omitted. FIG. 7 is different from FIG. 6 lies in that in addition to the GPS receiver of the mobile terminal device, an acceleration sensor is used to check the speed of the vehicle in which the user of the mobile terminal device is riding. In other words, with only the GPS receiver in FIG. 6, it is likely that the GPS receiver does not operate properly in a tunnel, and an error occurs in the speed calculation. Therefore, the speed calculation using the acceleration sensor is added.

In FIG. 7, first, in step S701, it is determined whether or not the GPS receiver can receive GPS signals. If the GPS receiver can receive the GPS signals, processes similar to S601 and subsequent processes of FIG. 6 are performed. If the GPS receiver is unable to receive the GPS signals, in S702, acceleration is measured by the acceleration sensor of the mobile terminal device. In S703, the speed is calculated from a previous speed, an elapsed time from the previous speed measurement, and an acceleration measurement value. Then, it is determined whether or not the speed calculated in S605 is a predetermined value or more.

As a further modified example, it is possible to determine that the vehicle is traveling if it is possible to photograph the scenery outside the vehicle with the camera of the mobile terminal device and photograph where the scenery flows. Further, the driving state may be determined by capturing an engine sound or a motor sound of a vehicle with the microphone of the mobile terminal device. The mobile terminal device may receive speed information from the vehicle.

Figure 8:
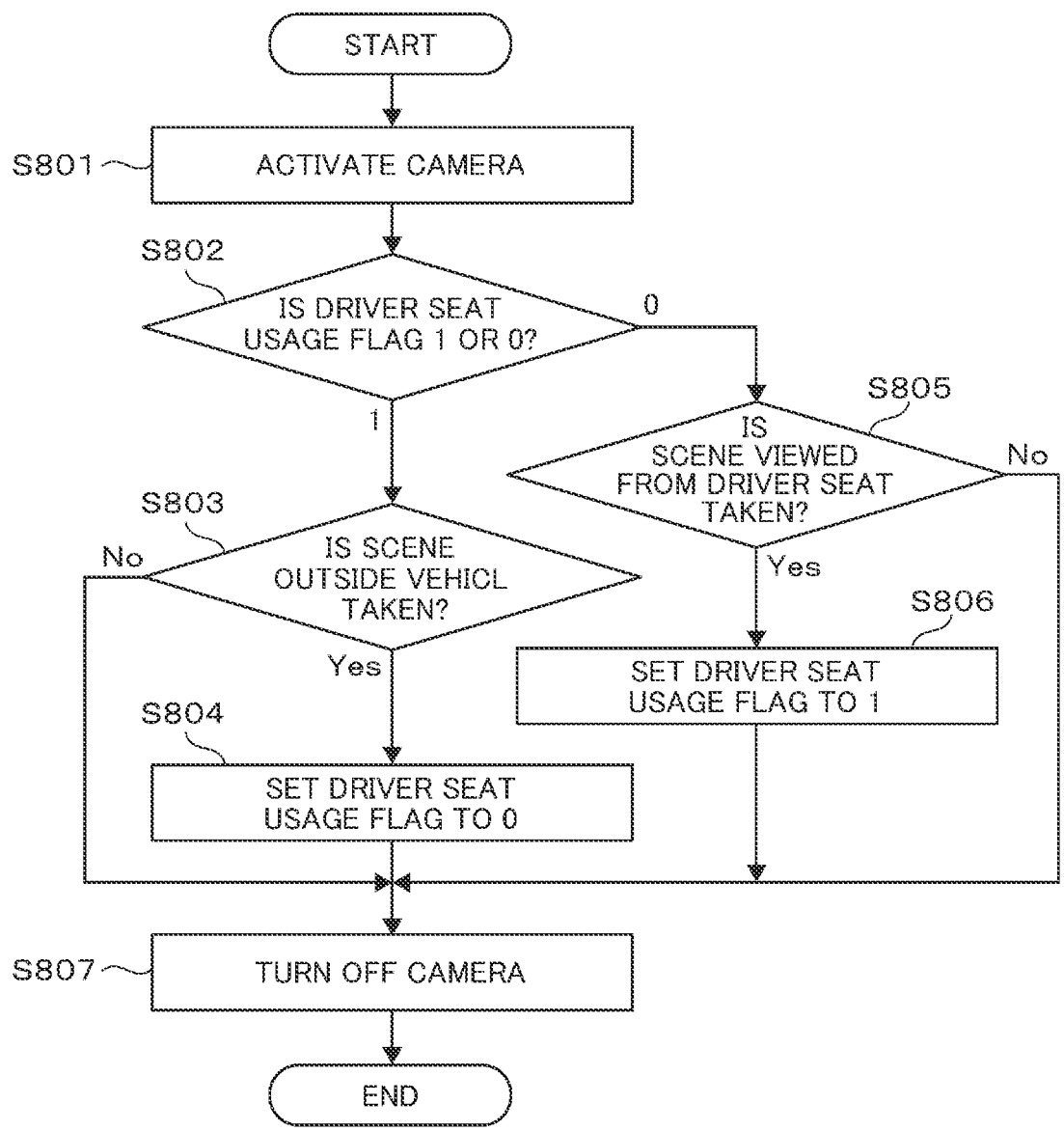
FIG. 8 is a flowchart illustrating a usage position check process of FIG. 4 in the first embodiment.

FIG. 8 is a flowchart illustrating the usage position check process of S402 in FIG. 4 in the present embodiment. In FIG. 8, the camera of the mobile terminal device is used to check whether or not the user of the mobile terminal device is at the driver seat. In FIG. 8, first, in step S801, the camera of the mobile terminal device is activated. Next, in S802, it is determined whether or not the current driver seat usage flag is 1 or 0. When the driver seat usage flag is 1, it means that the user of the mobile terminal device is sitting on the driver seat, and in S803, it is checked whether or not the state is changed thereafter. That is, it is determined whether or not the user of the mobile terminal device gets out of the vehicle on the basis of whether or not the scene outside the vehicle is taken. Examples of the scene outside the vehicle include a scene of an exterior of the vehicle car and a scene in which the vehicle's pillar is not taken in a spacious scene. When the scene outside the vehicle is taken, it is determined that the user of the mobile terminal device is not sitting on the driver seat, in S804, the driver seat usage flag is set to 0, and in S807, the camera is turned off, and the process ends.

On the other hand, when the driver seat usage flag is 0 in S802, it means that the user of the mobile terminal device is not sitting on the driver seat, and in S805, it is checked whether or not the state is changed thereafter. In other words, it is determined whether or not the user of the mobile terminal device is sitting on the driver seat on the basis of whether or not the scene viewed from the driver seat is taken. Specifically, the scene viewed from the driver seat is a scene in which the handle, the speedometer, and the like are taken in a close range. It also includes receiving information on whether or not it is the right handle or the left handle from the vehicle and determining from the scene of the front camera. Then, when the scene viewed from the driver seat is taken, it is determined that the user of the mobile terminal device is sitting on the driver seat, in S806, the driver seat usage flag is set to 1, and in S807, the camera is turned off, and the process ends.

Figure 9:
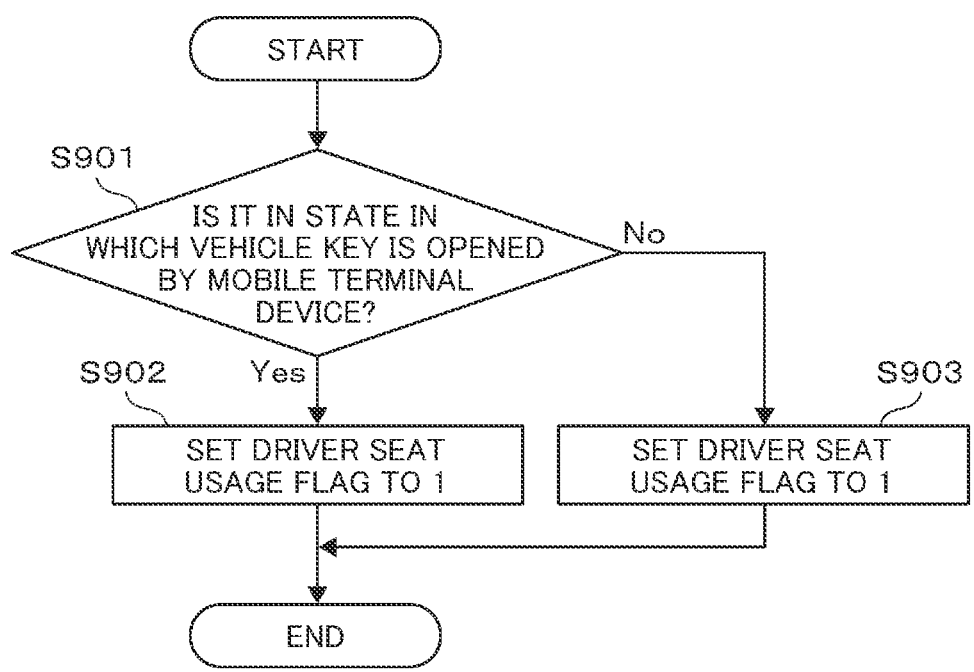
FIG. 9 is a flowchart illustrating a modified example of the usage position check process of FIG. 4 in the first embodiment.

FIG. 9 is a flowchart illustrating a modified example of the usage position check process of S402 of FIG. 4 in the present embodiment. FIG. 9 illustrates a process in which a case in which locking and unlocking of the vehicle can be operated by the mobile terminal device is assumed. In FIG. 9, in step S901, it is determined whether or not it is a state in which the key of the vehicle is operated by the mobile terminal device, that is, whether or not the mobile terminal device unlocks the vehicle. When the vehicle is unlocked by the mobile terminal device, it can be determined that the user of the mobile terminal device drives the vehicle, and thus it is determined that the user of the mobile terminal device is sitting on the driver seat, the driver seat usage flag is set to 1 in S902, and the process ends.

On the other hand, when it is not the state in which the key of the vehicle is opened by the mobile terminal device in step S901, that is, when the vehicle is not unlocked by the mobile terminal device, since it can be determined that the user of the mobile terminal device does not drive the vehicle, it is determined that the user of the mobile terminal device is not sitting on the driver seat, the driver seat usage flag is set to 0 in S903, and the process ends. In the present flow, the state in which the key of the vehicle is unlocked by the mobile terminal device is maintained while driving, and when the driver gets off the vehicle and locks the vehicle, the state in which the key of the vehicle is opened by the mobile terminal device is released. The unlocking of the vehicle may be limited to the door on the driver seat side. Also, if it is possible to start a vehicle engine by the mobile terminal device, when the engine is started by the mobile terminal device instead of the unlocking of the vehicle, the user of the mobile terminal device can be determined to drive the vehicle, and thus it may be determined that the user of the mobile terminal device is sitting on the driver seat, and the driver seat usage flag may be set to 1.

As described above, the present embodiment provides a function limitation method of a mobile terminal device with function limitation capable of limiting a use of an application, including: a step of determining whether or not a limitation target application of the mobile terminal device is in activation; a usage position check step of determining, by the mobile terminal device, a user of the mobile terminal device is on a driver seat; and a speed check step of calculating, by the mobile terminal device, a vehicle in which the user of the mobile terminal device is riding is traveling, in which the use of the application is limited or terminated when the user of the mobile terminal device is on the driver seat, and the vehicle is traveling.

Further, provided is a mobile terminal device with function limitation capable of limiting a use of an application, including: a CPU; a camera; a GPS receiver; and a storage that stores an operating program, in which the CPU determines, by the operating program stored in the storage, whether or not a user of the mobile terminal device is on a driver seat on the basis of whether or not a scene outside a vehicle is taken or a scene viewed from the driver seat is taken using the camera, calculates a speed of the vehicle in which the user of the mobile terminal device is riding using the GPS receiver, and limiting or terminating the use of the application when the user of the mobile terminal device is sitting on the driver seat and the vehicle is traveling.

Further, provided is a processing program that executes function limitation on a mobile terminal device with function limitation capable of limiting a use of an application, including: a step of determining whether or not a limitation target application of the mobile terminal device is in activation; a step of determining, by the mobile terminal device, a user of the mobile terminal device is on a driver seat; a step of calculating, by the mobile terminal device, a vehicle in which the user of the mobile terminal device is riding is traveling; and a step of limiting or terminating the use of the application when the user of the mobile terminal device is on the driver seat, and the vehicle is traveling.

Therefore, according to the present embodiment, it is possible to provide a mobile terminal device with function limitation, a function limitation method thereof, and a processing program used in the same which are capable of detecting the position of the user of the mobile terminal device or the speed of the vehicle and limiting the use of the application through the mobile terminal device alone.

Second Embodiment

In the first embodiment, the mobile terminal device that can detect the user position of the mobile terminal device and the speed of the vehicle and limit the use thereof through the mobile terminal device alone has been described. In the present embodiment, the mobile terminal device that can further limit the use of the application of the mobile terminal device in accordance with the position of the vehicle will be described.

Figure 10:
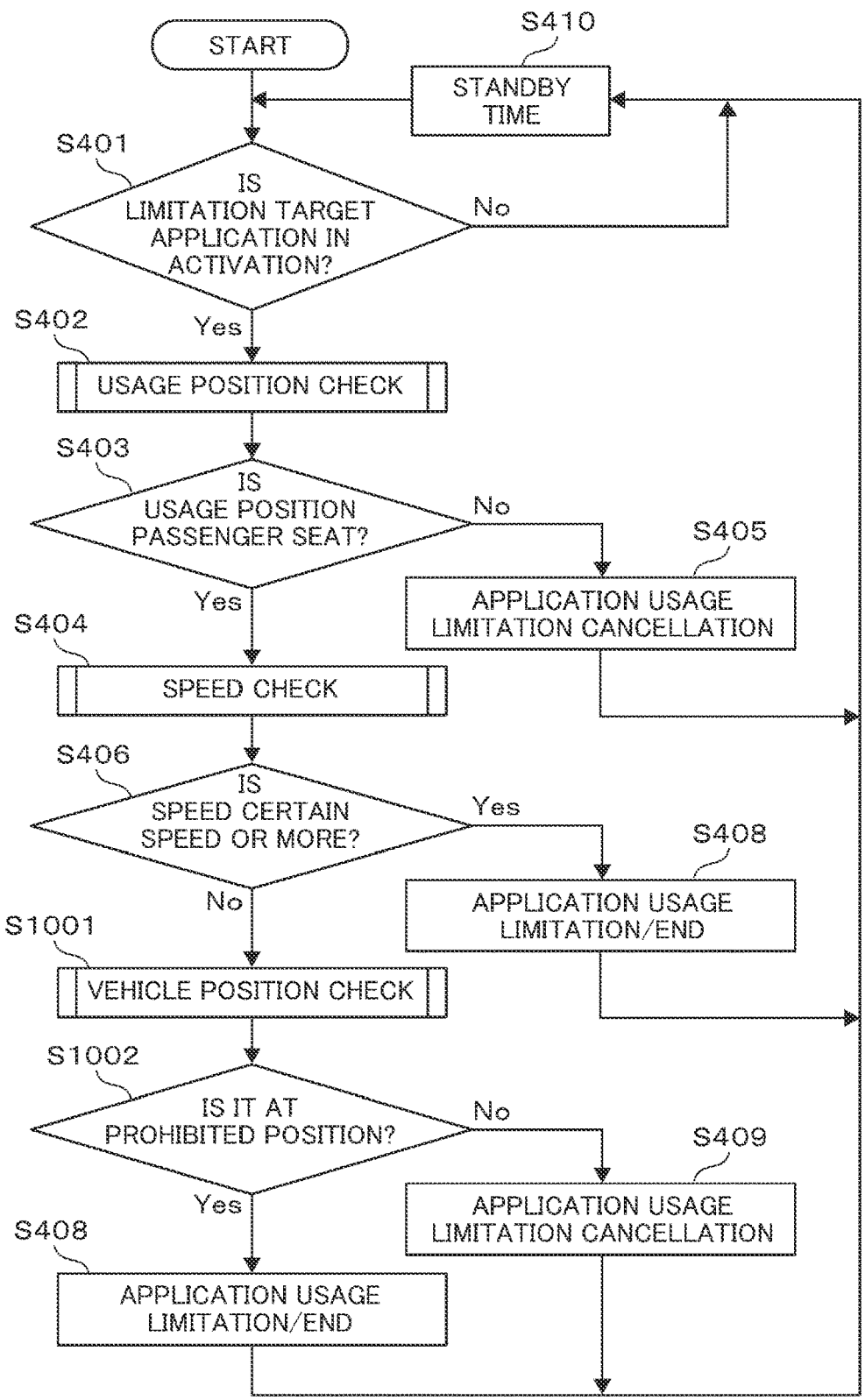
FIG. 10 is a flowchart illustrating a process for limiting the use of an application of a mobile terminal device in a second embodiment.

FIG. 10 is a flowchart illustrating a process of limiting the use of the application of the mobile terminal device in the present embodiment. In FIG. 10, processes similar to those of FIG. 4 of the first embodiment are denoted by the same reference numerals, and description thereof is omitted. FIG. 10 is different from FIG. 4 lies in that step S1001 and S1002 are added.

In FIG. 10, in S1001, the vehicle position check process of checking the position of the vehicle in which the user using the mobile terminal device is riding is executed. The vehicle position check process of S1001 will be described later in detail, but it is a check to see if there is a vehicle at a prohibition position at which the vehicle is not allowed to stop such as an intersection, and as illustrated in FIG. 10, since the assumption in the vehicle position check process of S1001 is that the user of the mobile terminal device is on the driver seat but the vehicle is stopped, for example, the usage limitation of the application is canceled in a state in which the vehicle is stopped on red, but since the vehicle has to immediately move from the vehicle prohibition position if possible, when the vehicle is at the prohibition position, the vehicle position prohibition flag is to 1 in order to restrict or terminate the use of the application. Then, in S1002, it is determined whether or not the position of the vehicle in which the user using the mobile terminal device is riving is the vehicle prohibition position, and if it is the prohibition position, in S408, the use of the application is limited or terminated, and the process returns to S410. If it is not the prohibition position, in S409, the application usage limitation is canceled, and the process returns to S410.

FIG. 11 is a condition diagram for describing conditions for limiting the use of the application of the mobile terminal device in the present embodiment. FIG. 11 illustrates a relation of the overspeed flag and the driver seat usage flag described in the first embodiment, the vehicle position prohibition flag, and the process while the application is in activation. In FIG. 11, a combination in which the overspeed flag and the driver seat usage flag are not 0 and 1, respectively, is similar to content described in FIG. 5 in the first embodiment, and the process while the application is in activation is determined regardless of the vehicle position prohibition flag. On the other hand, when the overspeed flag and the driver seat usage flag are 0 and 1, respectively, and the vehicle position prohibition flag is 1, since the user of the mobile terminal device is sitting on the driver seat, the vehicle is stopped, but the vehicle is stopped at the vehicle prohibition position, the use of the application is limited or terminated. Further, when the overspeed flag and the driver seat usage flag are 0 and 1, respectively, and the vehicle position prohibition flag is 0, since the user of the mobile terminal device is sitting on the driver seat, the vehicle is stopped, and the vehicle is not stopped at the vehicle prohibition position, the usage limitation of the application is canceled, and the application can be used.

FIG. 12 is a flowchart illustrating the vehicle position check process of S1001 in FIG. 10 in the present embodiment. In FIG. 12, first, in step S1201, the vehicle position is measured. The vehicle position can be measured using the GPS receiver of the mobile terminal device. Then, it is determined whether or not the vehicle is at the prohibition position by comparing the vehicle position measured in S1202 with the prohibition position at which the vehicle is not allowed to stop such as the intersection. Then, if the vehicle is at the prohibition position, in S1203, the vehicle position prohibition flag is set to 1, and if the vehicle is not at the prohibition position, in S1204, the vehicle position prohibition flag is set to 0, and the process ends.

As described above, according to the present embodiment, it is possible to provide a mobile terminal device with function limitation, a function limitation method thereof, and a processing program used in the same which are capable of detecting the position of the user of the mobile terminal device, the speed of the vehicle, and the position of the vehicle and limiting the use of the application through the mobile terminal device alone.

The embodiment has been described in detail in order to facilitate understanding of the present invention, and the present invention is not necessarily limited to a configuration including all the components described above. Further, some of the components of a certain embodiment may be replaced with the components of another implementation, and the components of another embodiment may be added to the components of a certain embodiment. Further, addition, deletion, and substitution of other components can be performed on some components of each embodiment.

REFERENCE SIGNS LIST

100 Mobile terminal device
101 Delivery server
102 Wide area public network
103 Access point (AP) device
104 Mobile server
104b Base station
201 CPU
203 ROM
204 RAM
210 Storage
220 Communication processor
225 Extended interface
230 Operating device
240 Video processor
250 Audio processor
260 Sensor

The invention claimed is:

1. A mobile terminal comprising:
a CPU for executing programs including at least one limitation target program;
wireless communication circuitry for communicating to a network;
proximity wireless communication circuitry for transmitting information relating to unlocking a door of a vehicle;
a GPS signal receiver; and
a storage for storing the programs,
wherein the CPU is configured to:
acquire a speed at which the mobile terminal is moving;
determine whether a user of the mobile terminal is on a driver seat of the vehicle; and
limit or terminate to execute the limitation target program when the user of the mobile terminal is on the driver seat and the speed exceeds a predetermined speed, and
wherein the CPU is further configured to:
determine whether the mobile terminal has transmitted the information relating to unlocking the door of the vehicle via the proximity wireless communication circuitry; and
if transmitted, determine that the user of the mobile terminal is on the driver seat of the vehicle.

2. The mobile terminal according to claim 1, wherein the CPU is further configured to acquire the speed at which the mobile terminal is moving based on GPS signals received via the GPS signal receiver and/or wireless communication signals received via the wireless communication circuitry.

3. The mobile terminal according to claim 2, wherein the CPU is further configured to acquire the speed at which the mobile terminal is moving based on a plurality of pieces of position information calculated using GPS signals received in a predetermined period by the GPS receiver and an elapsed time of the predetermined period.

4. The mobile terminal according to claim 1, further comprising an acceleration sensor,
wherein the CPU is further configured to acquire the speed at which the mobile terminal is moving based on a plurality of acceleration measurements by the acceleration sensor.

5. The mobile terminal according to claim 1, further comprising a camera,
wherein the CPU is further configured to acquire the speed at which the mobile terminal is moving based on image signals of a scene outside the vehicle captured by the camera.

6. The mobile terminal according to claim 1, further comprising a microphone,
wherein the CPU is further configured to acquire the speed at which the mobile terminal is moving based on a sound received by the microphone.

7. The mobile terminal according to claim 1, wherein the CPU is further configured to acquire the speed at which the mobile terminal is moving based on speed information received from the vehicle via the proximity wireless communication circuitry.

8. The mobile terminal according to claim 1, wherein the proximity wireless communication circuitry performs Bluetooth communication and/or near field communication with the vehicle.

9. A mobile terminal comprising:
a CPU for executing programs including at least one limitation target program;
wireless communication circuitry for communicating to a network;
proximity wireless communication circuitry for transmitting information relating to causing an engine of a vehicle to start;
a GPS signal receiver; and
a storage for storing the programs,
wherein the CPU is configured to:
acquire a speed at which the mobile terminal is moving;
determine whether a user of the mobile terminal is on a driver seat of the vehicle; and
limit or terminate to execute the limitation target program when the user of the mobile terminal is on the driver seat and the speed exceeds a predetermined speed, and
wherein the CPU is further configured to:
determine whether the mobile terminal has transmitted the information relating to causing the engine of the vehicle to start via the proximity communication circuitry; and
if transmitted, determine that the user of the mobile terminal is on the driver seat of the vehicle.

10. The mobile terminal according to claim 9, wherein the CPU is further configured to acquire the speed at which the mobile terminal is moving based on GPS signals received via the GPS signal receiver and/or wireless communication signals received via the wireless communication circuitry.

11. The mobile terminal according to claim 10, wherein the CPU is further configured to acquire the speed at which the mobile terminal is moving based on a plurality of pieces of position information calculated using GPS signals received in a predetermined period by the GPS signal receiver and an elapsed time of the predetermined period.

12. The mobile terminal according to claim 9, further comprising an acceleration sensor,
wherein the CPU is further configured to acquire the speed at which the mobile terminal is moving based on a plurality of acceleration measurements by the acceleration sensor.

13. The mobile terminal according to claim 9, further comprising a camera,
wherein the CPU is further configured to acquire the speed at which the mobile terminal is moving based on image signals of a scene outside the vehicle captured by the camera.

14. The mobile terminal according to claim 9, further comprising a microphone,
 wherein the CPU is further configured to acquire the speed at which the mobile terminal is moving based on a sound received by the microphone.

15. The mobile terminal according to claim 9, wherein the CPU is further configured to acquire the speed at which the mobile terminal is moving based on speed information received from the vehicle via the proximity wireless communication circuitry.

16. The mobile terminal according to claim 9, wherein the proximity wireless communication circuitry performs Bluetooth communication and/or near field communication with the vehicle.

\* \* \* \* \*